US012780985B2

(12) United States Patent
Lee et al.

(10) Patent No.: US 12,780,985 B2
(45) Date of Patent: Nov. 3, 2026

(54) POLYCARBONATE COPOLYMER

(71) Applicant: LG CHEM, LTD., Seoul (KR)

(72) Inventors: Dayoung Lee, Daejeon (KR); Youngwook Son, Daejeon (KR); Hyong Min Bahn, Daejeon (KR); Yeji Yu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 449 days.

(21) Appl. No.: 18/576,734

(22) PCT Filed: May 11, 2023

(86) PCT No.: PCT/KR2023/006393

§ 371 (c)(1),
(2) Date: Jan. 4, 2024

(87) PCT Pub. No.: WO2023/234584

PCT Pub. Date: Dec. 7, 2023

(65) Prior Publication Data

US 2024/0368346 A1 Nov. 7, 2024

(30) Foreign Application Priority Data

May 30, 2022 (KR) ........................ 10-2022-0066173
May 4, 2023 (KR) ........................ 10-2023-0058350

(51) Int. Cl.
*C08G 64/12* (2006.01)
*C08G 64/26* (2006.01)

(52) U.S. Cl.
CPC ........... *C08G 64/12* (2013.01); *C08G 64/266* (2013.01)

(58) Field of Classification Search
CPC ...................................................... C08G 64/12
See application file for complete search history.

(56) References Cited

U.S. PATENT DOCUMENTS

| | | | | |
|---|---|---|---|---|
| 10,662,154 | B2 | 5/2020 | Swaminathan et al. | |
| 10,759,755 | B2 | 9/2020 | Mizoguchi et al. | |
| 11,118,009 | B2 | 9/2021 | Ozaki et al. | |
| 2005/0288517 | A1* | 12/2005 | Rai .................... | C08G 63/6856 548/472 |
| 2007/0055025 | A1* | 3/2007 | Rai ........................ | C08G 64/12 525/467 |
| 2013/0274417 | A1 | 10/2013 | Muthulakshmi et al. | |
| 2017/0166528 | A1 | 6/2017 | Peters et al. | |
| 2018/0355106 | A1 | 12/2018 | Morooka et al. | |
| 2019/0047954 | A1 | 2/2019 | Mizoguchi et al. | |
| 2019/0135748 | A1 | 5/2019 | Swaminathan et al. | |
| 2019/0203043 | A1* | 7/2019 | Van Der Mee .......... | C08J 7/056 |
| 2019/0337895 | A1 | 11/2019 | Peters et al. | |
| 2021/0054142 | A1 | 2/2021 | Ozaki et al. | |

FOREIGN PATENT DOCUMENTS

| | | | | |
|---|---|---|---|---|
| CN | 107915737 | A | 4/2018 | |
| CN | 114058002 | A | 2/2022 | |
| KR | 10-2017-0036733 | A | 4/2017 | |
| KR | 10-2018-0102562 | A | 9/2018 | |
| KR | 10-2019-0083236 | A | 7/2019 | |
| KR | 10-2020-0010230 | A | 1/2020 | |
| KR | 10-2021-0028478 | A | 3/2021 | |
| WO | 2017-182984 | A1 | 10/2017 | |
| WO | WO-2023018136 | A1 * | 2/2023 | ............. C08G 64/12 |

* cited by examiner

*Primary Examiner* — Marc S Zimmer
(74) *Attorney, Agent, or Firm* — Bryan Cave Leighton Paisner LLP

(57) ABSTRACT

The present disclosure relates to a polycarbonate copolymer, and can provide a polycarbonate copolymer that includes a repeating unit having a specific structure, thereby being improved particularly in heat resistance.

13 Claims, 3 Drawing Sheets

[FIG. 1]
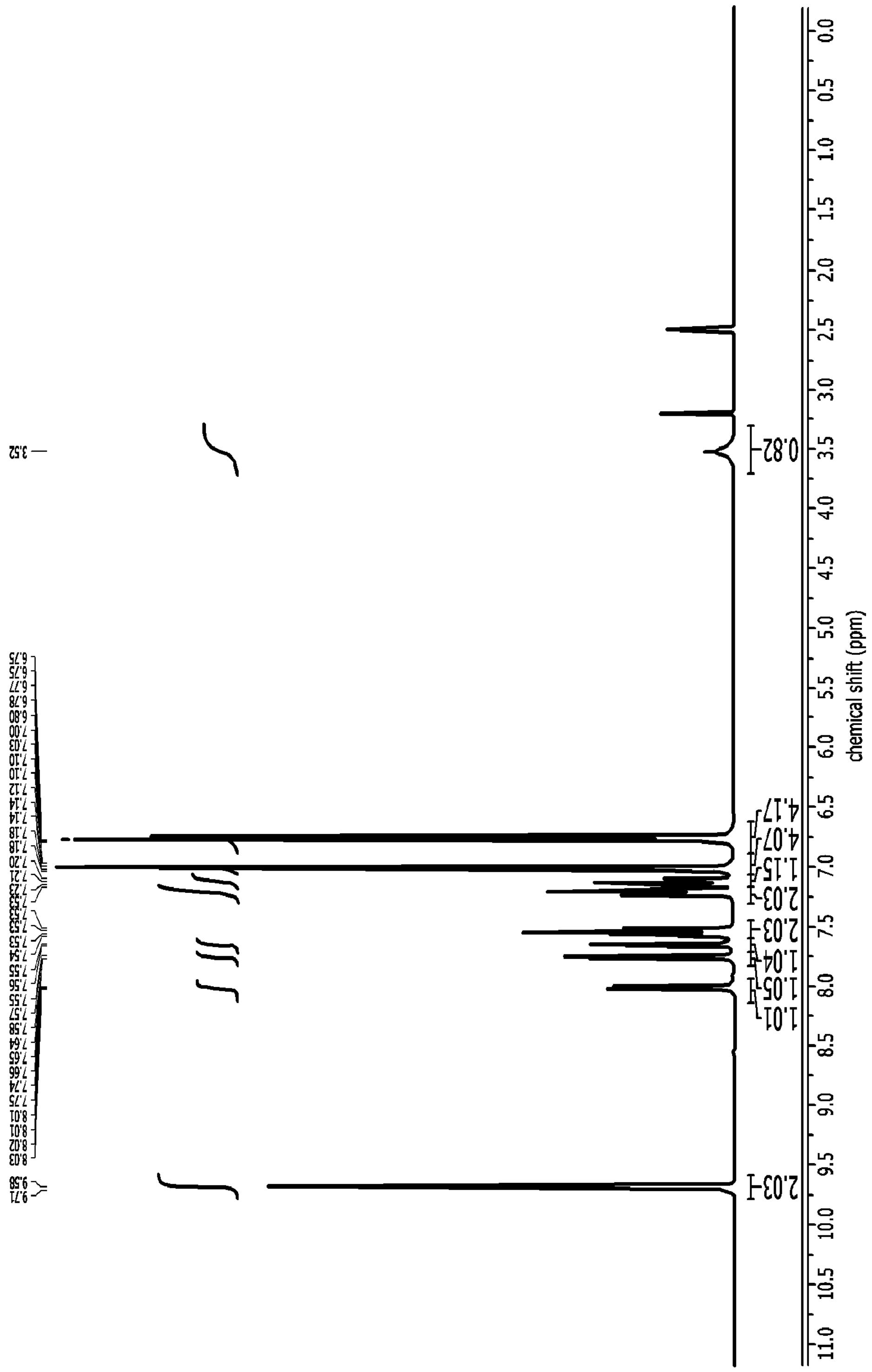

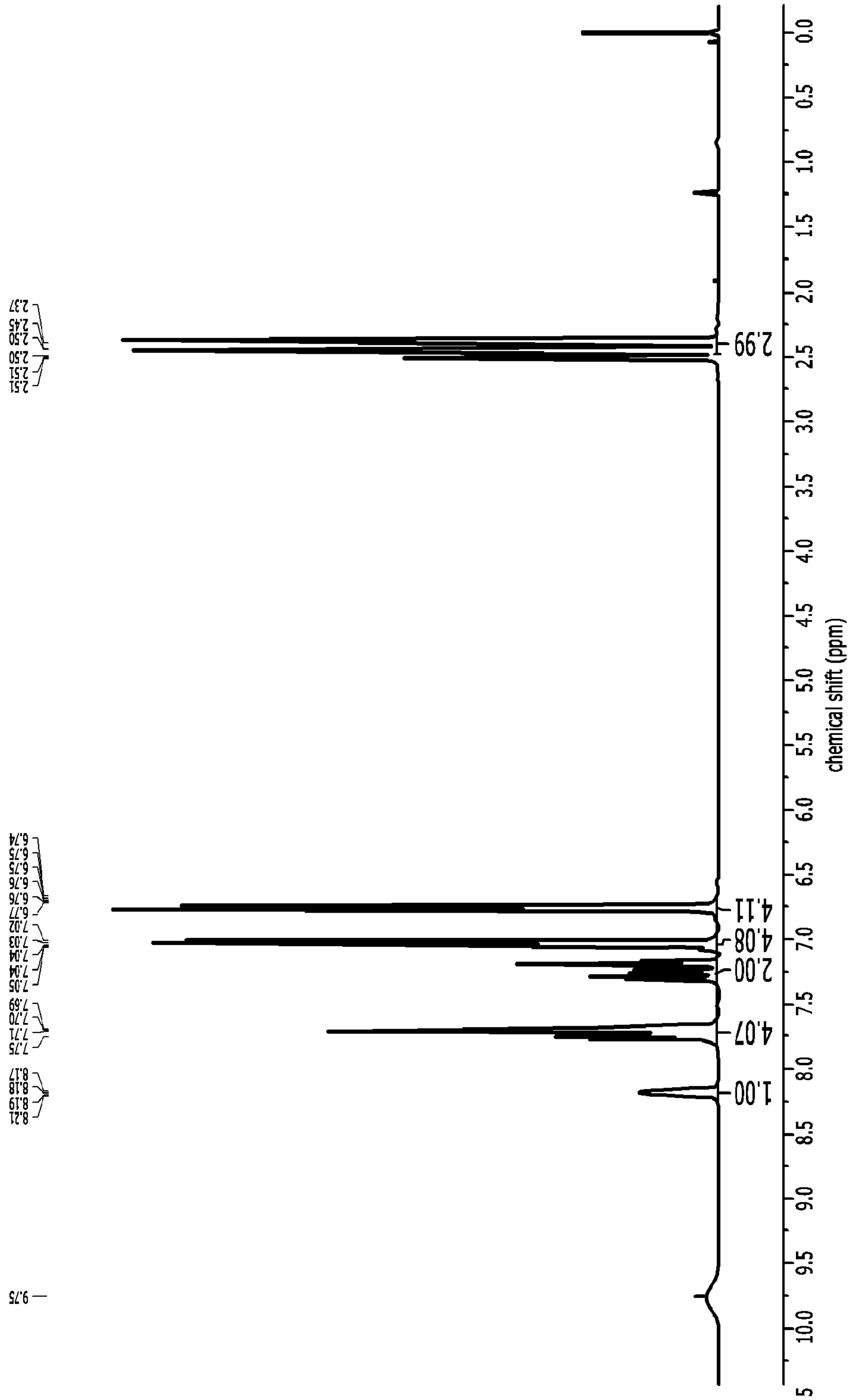
[FIG. 2]

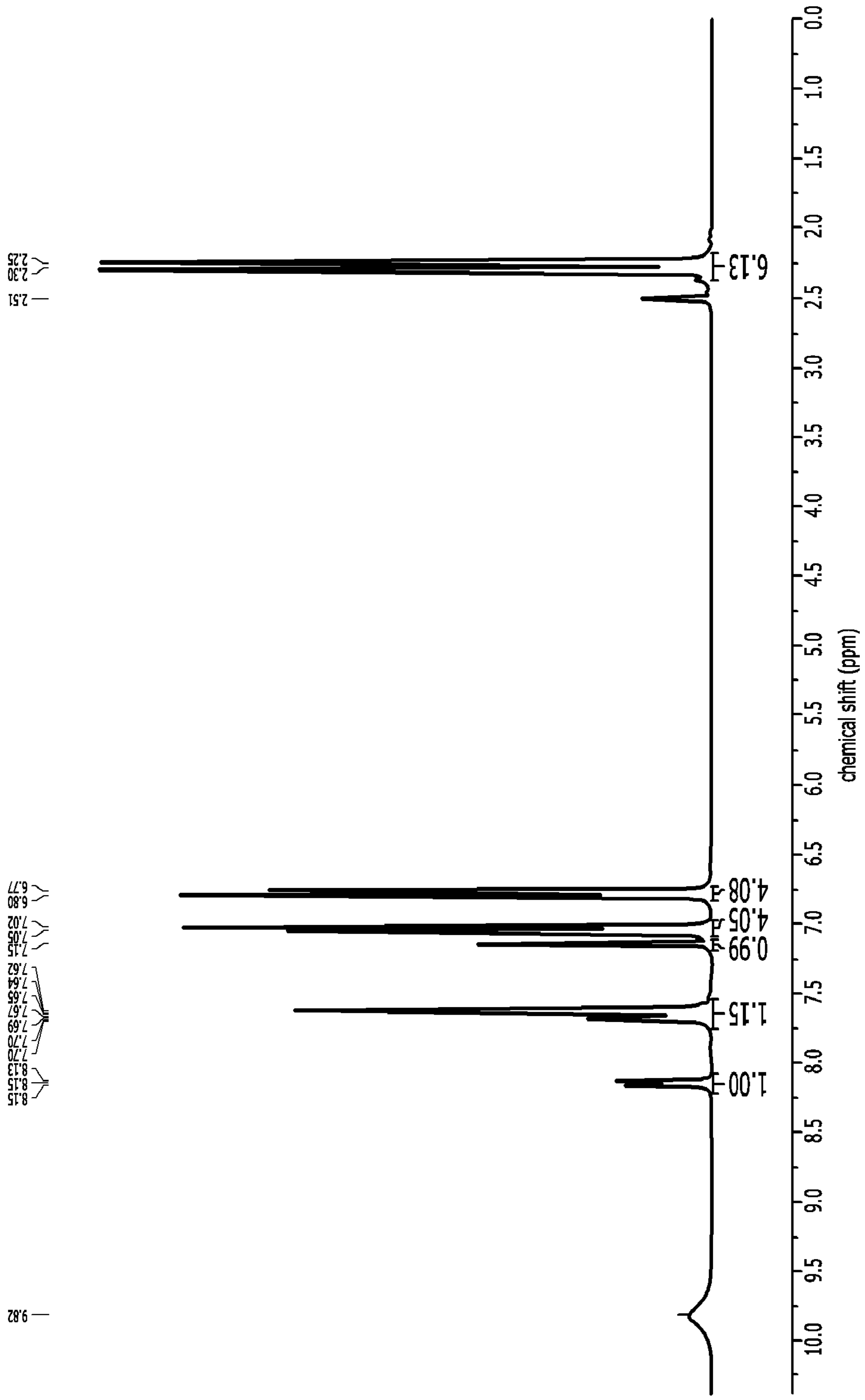
[FIG. 3]

POLYCARBONATE COPOLYMER

CROSS-REFERENCE TO RELATED APPLICATION(S)

This application is a National Phase entry pursuant to 35 U.S.C. § 371 of International Application No. PCT/KR2023/006393, filed on May 11, 2023, and claims the benefit of and priority to Korean Patent Application No. 10-2022-0066173, filed on May 30, 2022 and Korean Patent Application No. 10-2023-0058350, filed on May 4, 2023, with the Korean Intellectual Property Office, the disclosure of which are incorporated herein by reference in their entirety as if fully set forth herein.

TECHNICAL FIELD

The present disclosure relates to a polycarbonate copolymer and an article including the same.

BACKGROUND

A polycarbonate resin is prepared by condensation polymerization of an aromatic diol such as bisphenol A and a carbonate precursor such as phosgene, has excellent impact strength, dimensional stability, heat resistance and transparency, and is applied to a wide range of fields such as exterior materials of electrical and electronic products, automotive parts, construction materials, optical components, and the like.

Recently, in order to apply this polycarbonate resin to more various fields, many attempts have been made to obtain desired physical properties by copolymerizing two or more aromatic diols different from each other and introducing a monomer having a different structure to a polycarbonate main chain.

Particularly, with recent expansion of the application fields of polycarbonate resins, there is a need to develop polycarbonate resins having improved heat resistance while maintaining the intrinsic physical properties. Accordingly, attempts to introduce repeating units having various structures as repeating units of polycarbonate resins are increasing.

Therefore, the present inventors have found that the polycarbonate copolymer including repeating units having a specific structure, as described later, is improved particularly in heat resistance, and completed the present disclosure.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

Technical Problem

It is an object of the present disclosure to provide a polycarbonate copolymer that includes a repeating unit having a specific structure, thereby being improved particularly in heat resistance.

It is another object of the present disclosure to provide an article including the polycarbonate copolymer.

Technical Solution

In order to achieve the above object, according to the present disclosure, there is provided a polycarbonate copolymer, including: a repeating unit represented by Chemical Formula 1; and a repeating unit represented by Chemical Formula 2 or Chemical Formula 3:

[Chemical Formula 1]

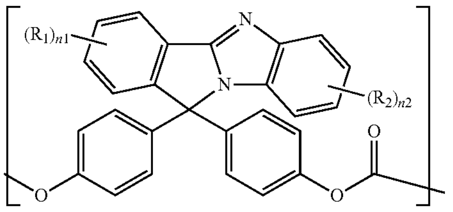

wherein in Chemical Formula 1, $R_1$ and $R_2$ are each independently hydrogen, a $C_{1-10}$ alkyl, a $C_{1-10}$ alkoxy, or a halogen, and n1 and n2 are each independently an integer of 0 to 4,

[Chemical Formula 2]

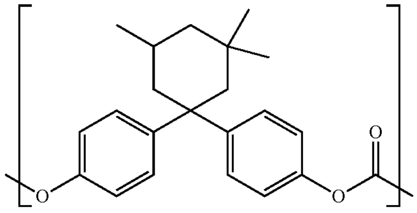

[Chemical Formula 3]

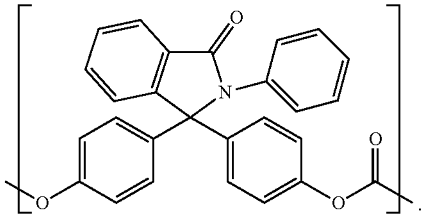

Polycarbonate copolymer according to the present disclosure includes the repeating unit represented by Chemical Formula 1 and the repeating unit represented by Chemical Formula 2 or Chemical Formula 3, whereby a polycarbonate copolymer which is increased particularly in heat resistance can be provided. The Chemical Formula 1 is similar to the structure of bisphenol A, which has been widely used in the past, but has a structure in which four rings are fused, and thus has a more rigid structure than bisphenol A. In addition, it is possible to improve heat resistance through structural stabilization by including nitrogen in the molecule. Further, Chemical Formula 2 and Chemical Formula 3 are also similar to the structure of bisphenol A, but have a cyclohexane structure (Chemical Formula 2) and a structure in which two rings are fused (Chemical Formula 3), so that such repeating units can be added to the copolymer to further improve heat resistance through structural stabilization.

Now, the present disclosure will be described in more detail.

(Repeating Unit Represented by Chemical Formula 1)

In Chemical Formula 1, preferably, $R_1$ is hydrogen.

Preferably, each $R_2$ is independently hydrogen, a $C_{1-4}$ alkyl, a $C_{1-4}$ alkoxy, or a halogen. More preferably, each $R_2$ is independently hydrogen, methyl, or chloro.

Preferably, Chemical Formula 1 is any one selected from the group consisting of the following:

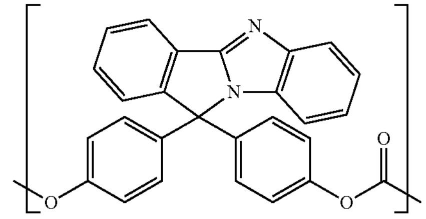

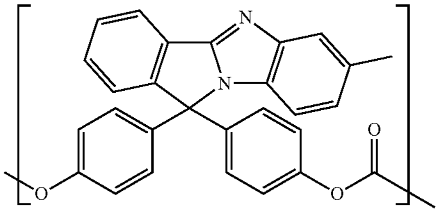

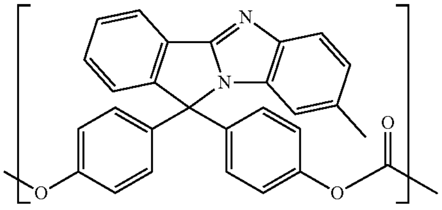

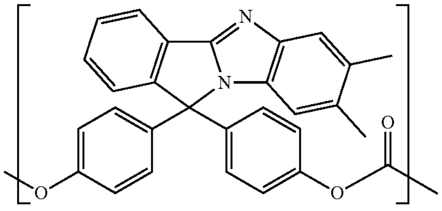

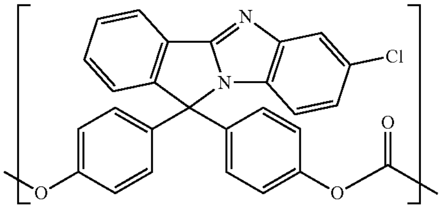

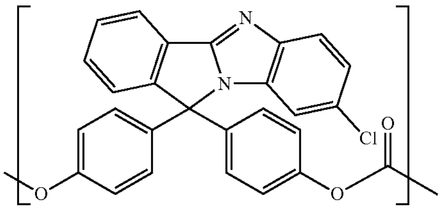

Meanwhile, the repeating unit represented by Chemical Formula 1 is derived from a monomeric compound represented by the following Chemical Formula 1-1.

[Chemical Formula 1-1]

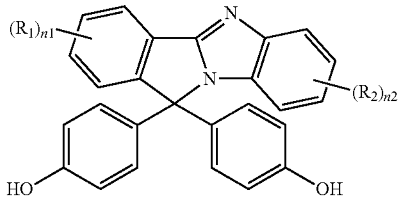

The phrase 'derived from a monomeric compound' means that a hydroxy group of the compound represented by Chemical Formula 1-1 reacts with a carbonate precursor to form the repeating unit represented by Chemical Formula 1.

The carbonate precursor may include one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis (diphenyl)carbonate, phosgene, triphosgene, diphosgene, bromophosgene and bishaloformate. Preferably, triphosgene or phosgene can be used.

Further, the compound represented by Chemical Formula 1-1 can be prepared by the method of the following Reaction Scheme 1.

[Reaction Scheme 1]

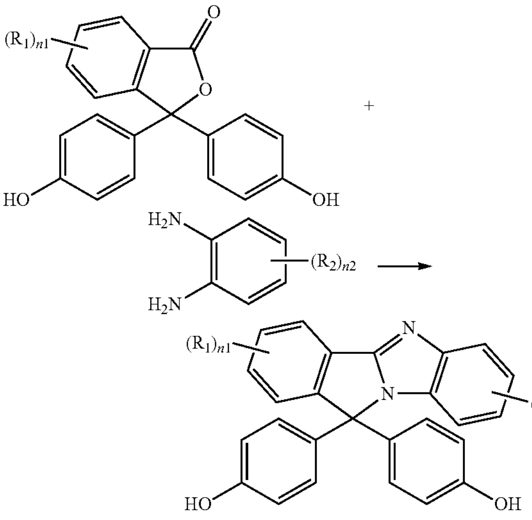

In Reaction Scheme 1, $R_1$, $R_2$, n1 and n2 are as defined above. The reaction is preferably carried out under acidic conditions, and the preparation method can be embodied in Examples provided hereafter.

(Repeating Unit Represented by Chemical Formula 2 or 3)

The polycarbonate copolymer according to the present disclosure includes a repeating unit represented by Chemical Formula 2 or Chemical Formula 3, and in this case, it may include only one type or may include two types together.

Meanwhile, the repeating unit represented by Chemical Formula 2 or Chemical Formula 3 is derived from a monomeric compound represented by the following Chemical Formula 2-1 or Chemical Formula 3-1, respectively.

[Chemical Formula 2-1]

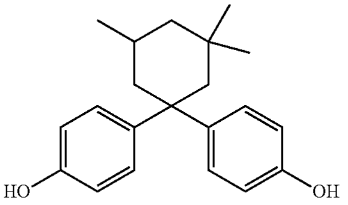

[Chemical Formula 3-1]

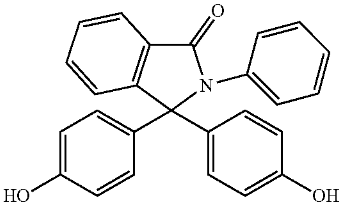

The phrase 'derived from a monomeric compound' means that a hydroxy group of the compound represented by Chemical Formula 2-1 or Chemical Formula 3-1 reacts with a carbonate precursor to form the repeating unit represented by Chemical Formula 2 or Chemical Formula 3.

The carbonate precursor may include one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis (diphenyl)carbonate, phosgene, triphosgene, diphosgene, bromophosgene and bishaloformate. Preferably, triphosgene or phosgene can be used.

Preferably, the polycarbonate according to the present disclosure contains 0.01 to 80% by weight of the repeating unit represented by Chemical Formula 1, and 0.01 to 80% by weight of the repeating unit represented by Chemical Formula 2 or Chemical Formula 3. Preferably, the weight ratio of the repeating unit represented by Chemical Formula 1 and the repeating unit represented by Chemical Formula 2 or Chemical Formula 3 is 1:999 to 999:1, more preferably 1:99 to 99:1, and most preferably 1:9 to 9:1.

(Repeating Unit Represented by Chemical Formula 4)

In addition, the polycarbonate copolymer of the present disclosure may further include a repeating unit represented by the following Chemical Formula 4, if necessary:

[Chemical Formula 4]

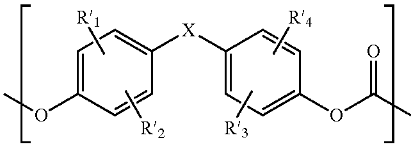

in Chemical Formula 4,

X is a $C_{1-10}$ alkylene unsubstituted or substituted with phenyl, a $C_{3-15}$ cycloalkylene unsubstituted or substituted with a $C_{1-10}$ alkyl, O, S, SO, $SO_2$, or CO, and $R'_1$ to $R'_4$ are each independently hydrogen, a $C_{1-10}$ alkyl, a $C_{1-10}$ alkoxy, or a halogen.

By further including the repeating unit represented by Chemical Formula 4, the physical properties of the polycarbonate copolymer can be adjusted together with the repeating unit represented by Chemical Formula 1 and the repeating unit represented by Chemical Formulas 2 or 3. For example, since the repeating unit represented by Chemical Formula 1 can improve heat resistance as compared with the repeating unit represented by Chemical Formula 4, the content of each repeating unit can be adjusted to obtain the desired heat resistance.

In Chemical Formula 4, preferably, X is a linear or branched $C_{1-10}$ alkylene unsubstituted or substituted with phenyl, and more preferably, it is methylene, ethane-1,1-diyl, propane-2,2-diyl, butane-2,2-diyl, 1-phenylethane-1,1-diyl, or diphenylmethylene. Still more preferably, X is cyclohexane-1,1-diyl, O, S, SO, $SO_2$, or CO.

Also, preferably, $R'_1$ to $R'_4$ are each independently hydrogen, methyl, chloro, or bromo.

Preferably, the repeating unit represented by Chemical Formula 4 may be derived from any one or more monomeric compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis (4-hydroxyphenyl) sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, and bis(4-hydroxyphenyl)diphenylmethane.

The phrase 'derived from a monomeric compound' means that a hydroxyl group of the monomeric compound reacts with the carbonate precursor to form the repeating unit represented by Chemical Formula 4.

For example, when bisphenol A as a monomeric compound and triphosgene as a carbonate precursor are polymerized, the repeating unit represented by Chemical Formula 4 has the following structure.

[Chemical Formula 4-1]

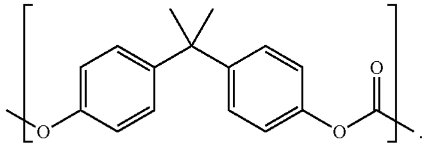

The carbonate precursor is the same as described above for the carbonate precursor that can be used in the formation of the repeating unit represented by Chemical Formula 1 described above.

Polycarbonate Copolymer

As described above, the polycarbonate copolymer according to the present disclosure includes a repeating unit represented by Chemical Formula 1 and a repeating unit represented by Chemical Formulas 2 or 3, and in this case, it becomes substantially a random copolymer.

Further, the polycarbonate copolymer according to the present disclosure further include a repeating unit represented by Chemical Formula 4, in addition to the repeating unit represented by Chemical Formula 1 and the repeating unit represented by Chemical Formula 2 or 3, and in this case, it becomes a random copolymer. Preferably, the weight ratio of (1) the repeating unit represented by Chemical Formula 1 and the repeating unit represented by Chemical Formula 2 or 3, and (2) the repeating unit represented by Chemical Formula 4 is 10:90 to 90:10, more preferably 15:85 to 85:15, and most preferably 20:80 to 80:20.

Preferably, the polycarbonate copolymer according to the present disclosure has a weight average molecular weight (g/mol) of 10,000 to 100,00. More preferably, the polycarbonate copolymer according to the present disclosure has a weight average molecular weight (g/mol) of 15,000 or more, 20,000 or more, 25,000 or more, 30,000 or more, or 35,000 or more; and 90,000 or less, 85,000 or less, 80,000 or less, 75,000 or less, 70,000 or less, 65,000 or less, 60,000 or less, or 55,000 or less.

Preferably, the glass transition temperature of the polycarbonate copolymer according to the present disclosure is 155 to 245° C. More preferably, the glass transition temperature of the polycarbonate copolymer according to the present disclosure is 156° C. or more, 157° C. or more, 158° C. or more, 159° C. or more, or 160° C. or more; and 240° C. or less, or 235° C. or less.

Preferably, the tensile strength of the polycarbonate copolymer according to the present disclosure is 67 to 95 MPa. More preferably, the tensile strength of the polycarbonate copolymer according to the present disclosure is 68 MPa or more, 69 MPa or more, 70 MPa or more, 71 MPa or more, 72 MPa or more, 73 MPa or more, 74 MPa or more, 75 MPa or more, 76 MPa or more, 77 MPa or more, 78 MPa or more, 79 MPa or more, or 80 MPa or more; and 94 MPa or less, 93 MPa or less, 92 MPa or less, 91 MPa or less, or 90 MPa or less.

Meanwhile, the polycarbonate copolymer according to the present disclosure can be prepared by including by a preparation method that includes polymerizing a composition containing the monomeric compound represented by Chemical Formula 1-1, the monomeric compound represented by Chemical Formula 2-1 or 3-1, and a carbonate precursor, and when it is desired to include the repeating unit represented by Chemical Formula 4, it can be prepared by including the repeating unit-related monomeric compound represented by Chemical Formula 4 in the composition.

As the polymerization method, an interfacial polymerization method may be used as an example, and in this case, the polymerization reaction can be performed at normal pressure and low temperature, and it exhibits the effect of facilitating molecular weight control. The interfacial polymerization is preferably performed in the presence of an acid binder and an organic solvent. In addition, the interfacial polymerization may include, for example, adding a coupling agent after pre-polymerization, and then performing re-polymerization.

Materials used in the interfacial polymerization are not particularly limited as long as they can be used in the polymerization of the polycarbonate copolymer, and the used amount thereof can be adjusted as required.

Examples of the acid binder include an alkali metal hydroxide such as sodium hydroxide or potassium hydroxide or an amine compound such as pyridine.

The organic solvent is not particularly limited as long as it is a solvent commonly used in the polymerization of polycarbonate, and an example thereof may include halogenated hydrocarbons such as methylene chloride and chlorobenzene.

Moreover, in the interfacial polymerization, a reaction promotor, for example, a tertiary amine compound such as triethylamine, tetra-n-butylammonium bromide and tetra-n-butylphosphonium bromide, a quaternary ammonium compound, a quaternary phosphonium compound, and the like may be further used for promoting the reaction.

The reaction temperature of the interfacial polymerization is preferably 0 to 40° C., and the reaction time is preferably 10 minutes to 5 hours. Further, during the interfacial polymerization reaction, it is preferred to maintain the pH to 9 or more or 11 or more.

Further, the interfacial polymerization may be performed by further including a molecular weight modifier. The molecular weight modifier can be added before, during or after the initiation of polymerization.

A mono-alkylphenol can be used as the molecular weight modifier, and by way of example, the mono-alkylphenol is one or more selected from the group consisting of p-tert-butylphenol, p-cumylphenol, decylphenol, dodecylphenol, tetradecylphenol, hexadecylphenol, octadecylphenol, eicosylphenol, docosylphenol and triacontylphenol. P-tert-butylphenol is preferred, and in this case, the effect of controlling the molecular weight is large.

Further, according to the present disclosure, there is provided an article comprising the polycarbonate copolymer described above.

Preferably, the article is an injection molded article. By way of example, the article may further include one or more selected from the group consisting of an antioxidant, a heat stabilizer, a light stabilizer, a plasticizer, an antistatic agent, a nucleating agent, a flame retardant, a lubricant, an impact modifier, an optical brightener, an UV absorber, a pigment and a dye.

The method for producing the article may include mixing the polycarbonate copolymer according to the present disclosure and an additive such as an antioxidant using a mixer, then extrusion molding the mixture with an extruder to produce a pellet, drying the pellet, and then injection molding the pellet with an injection molding machine.

Advantageous Effects

As described above, the present disclosure can provide a polycarbonate that includes a repeating unit having a specific structure copolymer, thereby being improved particularly in heat resistance.

BRIEF DESCRIPTION OF THE DRAWINGS

FIG. 1 shows $^1$H NMR (DMSO-$d_6$) data of the compound prepared in Preparation Example 1 of the present disclosure.

FIG. 2 shows the $^1$H NMR (DMSO-$d_6$) data of the compound prepared in Preparation Example 2 of the present disclosure.

FIG. 3 shows the $^1$H NMR (DMSO-$d_6$) data of the compound prepared in Preparation Example 3 of the present disclosure.

DETAILED DESCRIPTION

Hereinafter, embodiments of the present disclosure will be described in more detail with reference to the following Examples. However, the following Examples are for illustrative purpose only and not intended to limit the scope of the present disclosure.

Respective physical properties were measured as follows.

1) Weight average molecular weight (g/mol): calibrated and measured with PC standard using Agilent 1200 series.
2) Glass transition temperature (° C.): measured with DSC Q100 (TA Instrument).

PREPARATION EXAMPLE

Preparation Example 1-1: Preparation of Monomer 1-1

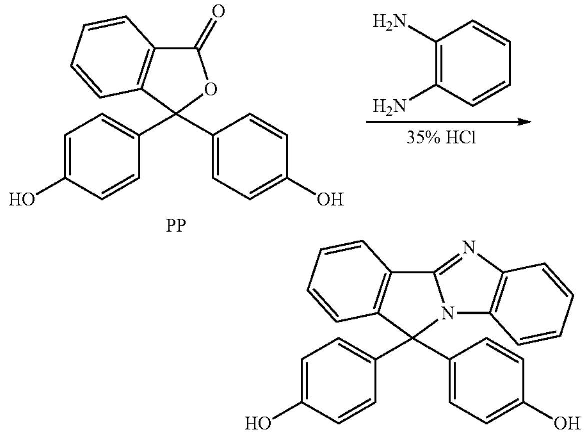

PP
Monomer 1-1

In a round bottom flask, O-phenylenediamine (13 g; 120 mmol) and 35% HCl (3.3 mL) were added, and the mixture was purged with nitrogen gas for 30 minutes and then stirred for 1 hour. PP Compound (10 g, 31.4 mmol) was added thereto and the temperature was slowly raised to 154° C., followed by reaction for 22 hours. The reaction mixture was cooled to 120° C., distilled water (30 mL) and 35% HCl (15.4 mL) were added, and stirred for 1 hour. After cooling to room temperature, the reaction mixture was filtered, washed with distilled water, and then dried. This was dissolved in a NaOH solution, adsorbed and filtered with charcoal, precipitated in HCl, and the precipitate was recovered to prepare Monomer 1-1. The NMR data of the prepared Monomer 1-1 is shown in FIG. 1, and the MS data are as follows.

MS: $[M+H]^+$=391

Preparation Example 1-2: Preparation of Monomer 1-2

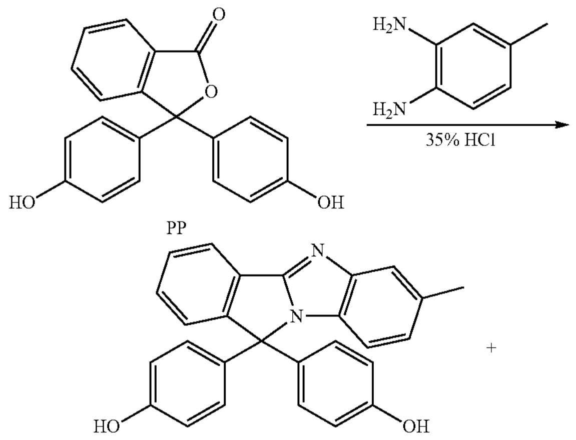

PP
Monomer 1-2

-continued

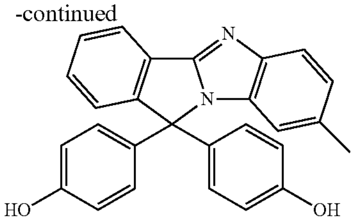
Monomer 1-2

Monomer 1-2 was prepared in the same manner as in Preparation Example 1-1, except that 3,4-diaminotoluene (15.4 g, 125.6 mmol) was instead of o-phenylenediamine. The NMR data of the prepared Monomer 1-2 is shown in FIG. 2, and the MS data are as follows.

MS: $[M+H]^+$=405

Preparation Example 1-3: Preparation of Monomer 1-3

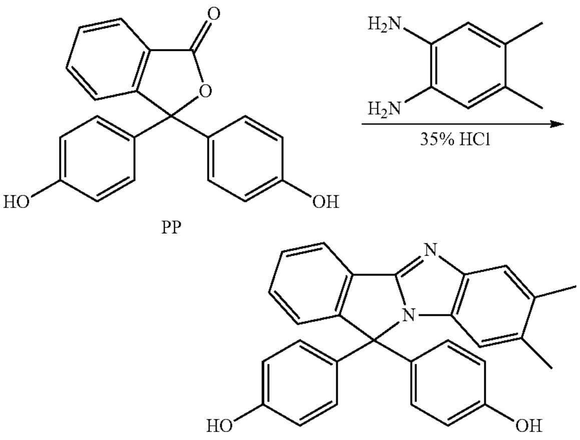

PP
Monomer 1-3

Monomer 1-3 was prepared in the same manner as in Preparation Example 1-1, except that 4,5-dimethylbenzene-1,2-diamine (17 g, 125.6 mmol) was used instead of o-phenylenediamine. The NMR data of the prepared Monomer 1-3 are shown in FIG. 3, and the MS data are as follows.

MS: $[M+H]^+$=419

Preparation Example 1-4: Preparation of Monomer 1-4

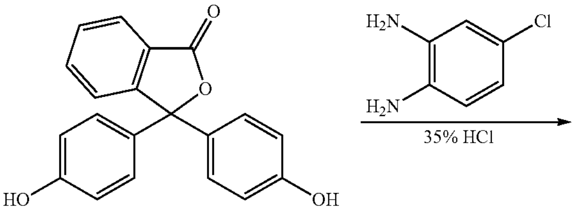

PP

-continued

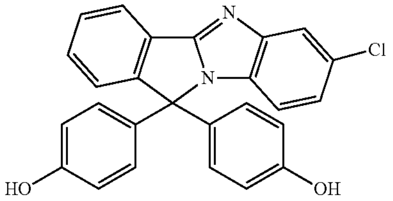

+

Monomer 1-4

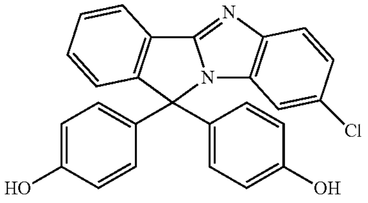

Monomer 1-4

Monomer 1-4 was prepared in the same manner as in Preparation Example 1-1, except that 4-chlorobenzene-1,2-diamine (17 g, 125.6 mmol) was used instead of o-phenylenediamine. The MS data of the prepared Monomer 1-4 are as follows.

MS: $[M+H]^+$=425

Preparation Examples 2-1 and 2-2

The following Monomers were purchased and used from Deepak Novochem Technologies Limited, respectively.

Monomer 2-1

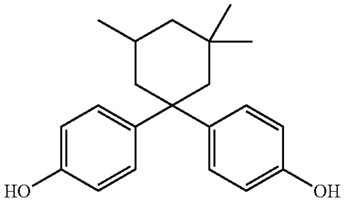

Monomer 2-2

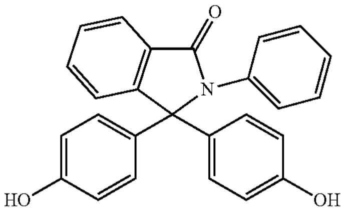

Example 1: Preparation of Polycarbonate Copolymer

In a 2 L main reactor equipped with a nitrogen purge and a condenser and capable of maintaining room temperature with a circulator, water (620 g), bisphenol A (BPA; 98.18 g), Monomer 1-3 (4.19 g), 40 wt. % NaOH aqueous solution (102.5 g), and $MeCl_2$ (200 mL) were added, and Monomer 2-1 (36.41 g) was further added. Then, the mixture was stirred for about 10 minutes. The nitrogen purge was stopped, and triphosgene (62 g) and $MeCl_2$ (120 g) were added to a 1 L round bottom flask to dissolve triphosgene, and then the dissolved triphosgene solution was slowly added to the main reactor. When the addition was completed, PTBP (p-tert-butylphenol; 2.84 g) was added, and stirred for about 10 minutes. Then, 40 wt. % of NaOH aqueous solution (97 g) was added, and then TEA (triethylamine; 1.16 g) was added as a coupling agent. At this time, the reaction pH was maintained at 11 to 13. In order to terminate the reaction after 30 minutes, HCl was added to drop the pH to 3-4.

Then, the process of stopping stirring, separating the organic layer and the aqueous layer, then removing the aqueous layer, adding pure water again and washing the mixture was repeated 3 to 5 times. After washing was completed, only the organic layer was extracted, and a polycarbonate copolymer crystal was obtained by reprecipitation methods using methanol as a non-solvent. At this time, the prepared polycarbonate copolymer had a weight average molecular weight of 47,000 g/mol. As a result of analyzing the prepared polycarbonate copolymer by NMR, it was confirmed that the repeating units derived from the Compounds 2-1 and 1-3 were contained at 18 wt. % and 2 wt. %, respectively, based on the weight of the total repeating units, and the remaining Examples and Comparative Examples below were also analyzed in the same manner.

Examples 2 to 12: Preparation of Polycarbonate Copolymers

Polycarbonate copolymers were prepared in the same manner as in Example 1, except that the used amount of Monomer 1-3, Monomer 2-1 and BPA was adjusted (Examples 2 to 6), or Monomer 2-2 was used instead of monomer 2-1, and the used amount of Monomer 1-3, Monomer 2-2 and BPA (Examples 7 to 12) was adjusted. At this time, the amount of PTBP (p-tert-butylphenol) as an end-capping agent was adjusted so that the weight average molecular weight of the prepared polycarbonate copolymer was 47,000.

Comparative Examples 1 to 3: Preparation of Polycarbonate

Polycarbonate was prepared in the same manner as in Example 1, except that Monomer 1-3 was not used, and the used amounts of Monomer 2-1 and BPA were adjusted. At this time, the amount of PTBP (p-tert-butylphenol) as an end-capping agent was adjusted so that the weight average molecular weight of the prepared polycarbonate copolymer was 47,000.

Comparative Examples 4 to 6: Preparation of Polycarbonate

Polycarbonate was prepared in the same manner as in Example 1, except that Monomer 1-3 was not used, Monomer 2-2 was used instead of Monomer 2-1, and the used amounts of Monomer 2-2 and BPA were adjusted. At this time, the amount of PTBP (p-tert-butylphenol) as an end-capping agent was adjusted so that the weight average molecular weight of the polycarbonate copolymer was 47,000.

Comparative Example 7: Preparation of Polycarbonate

Polycarbonate was prepared in the same manner as in Example 1, except that Monomers 1-3 and 2-1 were not used. The amount of PTBP (p-tert-butylphenol) as an end-capping agent was adjusted so that the weight average molecular weight of the polycarbonate copolymer was 47,000.

Experimental Example

With respect to the polycarbonate copolymers prepared in Examples and Comparative Examples, the glass transition temperature and the tensile strength were measured, and the tensile strength was measured according to ISO 527. The results are shown in Table 1 below. In Table 1 below, the content of each monomer means the content of the monomer relative to the total weight of the polycarbonate copolymer.

TABLE 1

| Unit | Content of Monomer 1-3 wt % | Content of Monomer 2-1 wt % | Content of Monomer 2-2 wt % | Content of BPA wt % | Tg ° C. | Tensile strength MPa |
|---|---|---|---|---|---|---|
| Example 1 | 2.0 | 18.0 | 0 | 80.0 | 160 | 68 |
| Example 2 | 0.2 | 19.8 | 0 | 80.0 | 159 | 67 |
| Example 3 | 6.0 | 54.0 | 0 | 40.0 | 193 | 77 |
| Example 4 | 0.6 | 59.4 | 0 | 40.0 | 191 | 74 |
| Example 5 | 8.0 | 72.0 | 0 | 20.0 | 214 | 81 |
| Example 6 | 0.8 | 79.2 | 0 | 20.0 | 212 | 78 |
| Example 7 | 2.0 | 0 | 18.0 | 80.0 | 163 | 69 |
| Example 8 | 0.2 | 0 | 19.8 | 80.0 | 162 | 68 |
| Example 9 | 6.0 | 0 | 54.0 | 40.0 | 203 | 79 |
| Example 10 | 6.0 | 0 | 59.4 | 40.0 | 201 | 76 |
| Example 11 | 8.0 | 0 | 72.0 | 20.0 | 233 | 86 |
| Example 12 | 0.8 | 0 | 79.2 | 20.0 | 231 | 82 |
| Comparative Example 1 | 0 | 20.0 | 0 | 80.0 | 159 | 66 |
| Comparative Example 2 | 0 | 60.0 | 0 | 40.0 | 190 | 73 |
| Comparative Example 3 | 0 | 80.0 | 0 | 20.0 | 211 | 76 |
| Comparative Example 4 | 0 | 0 | 20.0 | 80.0 | 161 | 67 |
| Comparative Example 5 | 0 | 0 | 60.0 | 40.0 | 200 | 75 |
| Comparative Example 6 | 0 | 0 | 80.0 | 20.0 | 230 | 80 |
| Comparative Example 7 | 0 | 0 | 0 | 100.0 | 147 | 63 |

As shown in Table 1, it was confirmed that the polycarbonate copolymer containing the repeating unit according to the present disclosure had a higher glass transition temperature than the polycarbonates of Comparative Examples. Therefore, it can be confirmed that as the repeating unit according to the present disclosure is included in the structure of the polycarbonate, thereby being improved in heat resistance.

The invention claimed is:

1. A polycarbonate copolymer, comprising:

a repeating unit represented by Chemical Formula 1; and a repeating unit represented by Chemical Formula 2 or Chemical Formula 3:

[Chemical Formula 1]

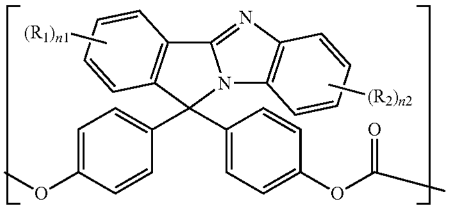

wherein in Chemical Formula 1, $R_1$ and $R_2$ are each independently hydrogen, a $C_{1-10}$ alkyl, a $C_{1-10}$ alkoxy, or a halogen, and n1 and n2 are each independently an integer of 0 to 4,

[Chemical Formula 2]

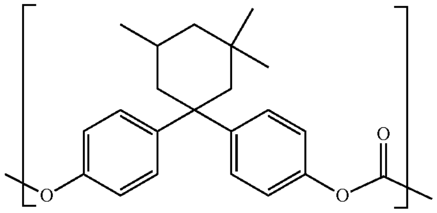

[Chemical Formula 3]

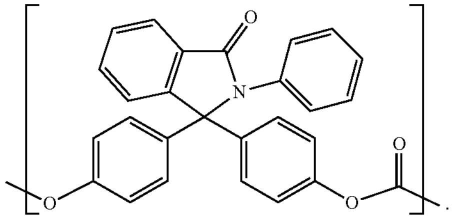

2. The polycarbonate copolymer of claim 1, wherein:

$R_1$ is hydrogen.

3. The polycarbonate copolymer of claim 1, wherein:

each $R_2$ is independently hydrogen, a $C_{1-4}$ alkyl, a $C_{1-4}$ alkoxy, or a halogen.

4. The polycarbonate copolymer of claim 1, wherein:

each $R_2$ is independently hydrogen, methyl, or chloro.

5. The polycarbonate copolymer of claim 1, wherein:

the repeating unit represented by Chemical Formula 1 is any one selected from the group consisting of the following:

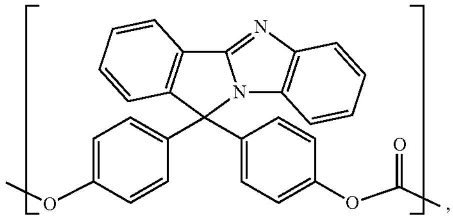

,

-continued

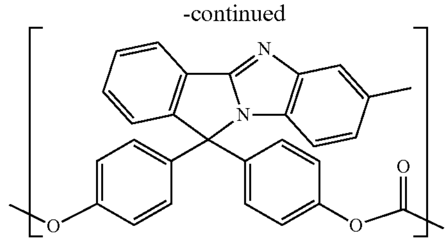

,

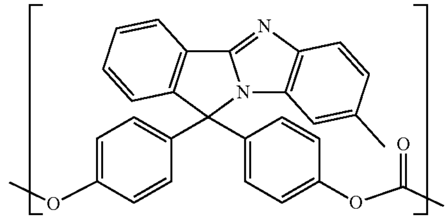

,

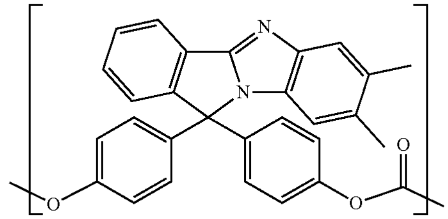

,

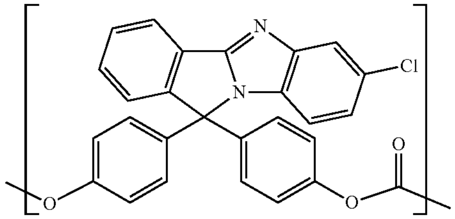

and

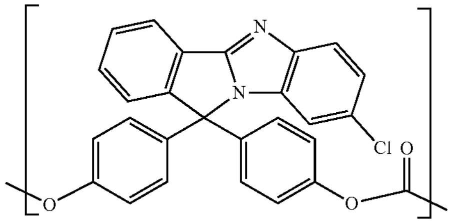

.

6. The polycarbonate copolymer of claim 1, wherein: the polycarbonate copolymer contains 0.01 to 80% by weight of the repeating unit represented by Chemical Formula 1, and 0.01 to 80% by weight of the repeating unit represented by Chemical Formula 2 or Chemical Formula 3.

7. The polycarbonate copolymer of claim 1, wherein: the polycarbonate copolymer further comprises a repeating unit represented by Chemical Formula 4:

[Chemical Formula 4]

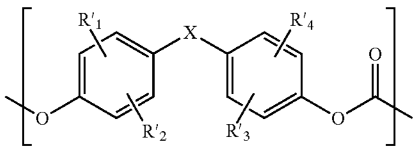

wherein in Chemical Formula 4,

X is a $C_{1-10}$ alkylene unsubstituted or substituted with phenyl, a $C_{3-15}$ cycloalkylene unsubstituted or substituted with a $C_{1-10}$ alkyl, O, S, SO, $SO_2$, or CO, and $R'_1$ to $R'_4$ are each independently hydrogen, a $C_{1-10}$ alkyl, a $C_{1-10}$ alkoxy, or a halogen.

8. The polycarbonate copolymer of claim 7, wherein: the repeating unit represented by Chemical Formula 4:

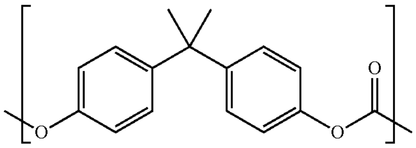

9. The polycarbonate copolymer of claim 7, wherein: the polycarbonate copolymer contains 20 to 80% by weight of the repeating unit represented by Chemical Formula 4.

10. The polycarbonate copolymer of claim 1, wherein: a weight average molecular weight of the polycarbonate copolymer is 10,000 to 100,000.

11. The polycarbonate copolymer of claim 1, wherein: a glass transition temperature of the polycarbonate copolymer is 155 to 245° C.

12. The polycarbonate copolymer of claim 1, wherein: a tensile strength of the polycarbonate copolymer is 67 to 95 MPa.

13. An article comprising the polycarbonate copolymer of claim 1.

* * * * *